3,468,686
METHOD OF CONTINUOUSLY PRODUCING DRY ROSIN SIZE

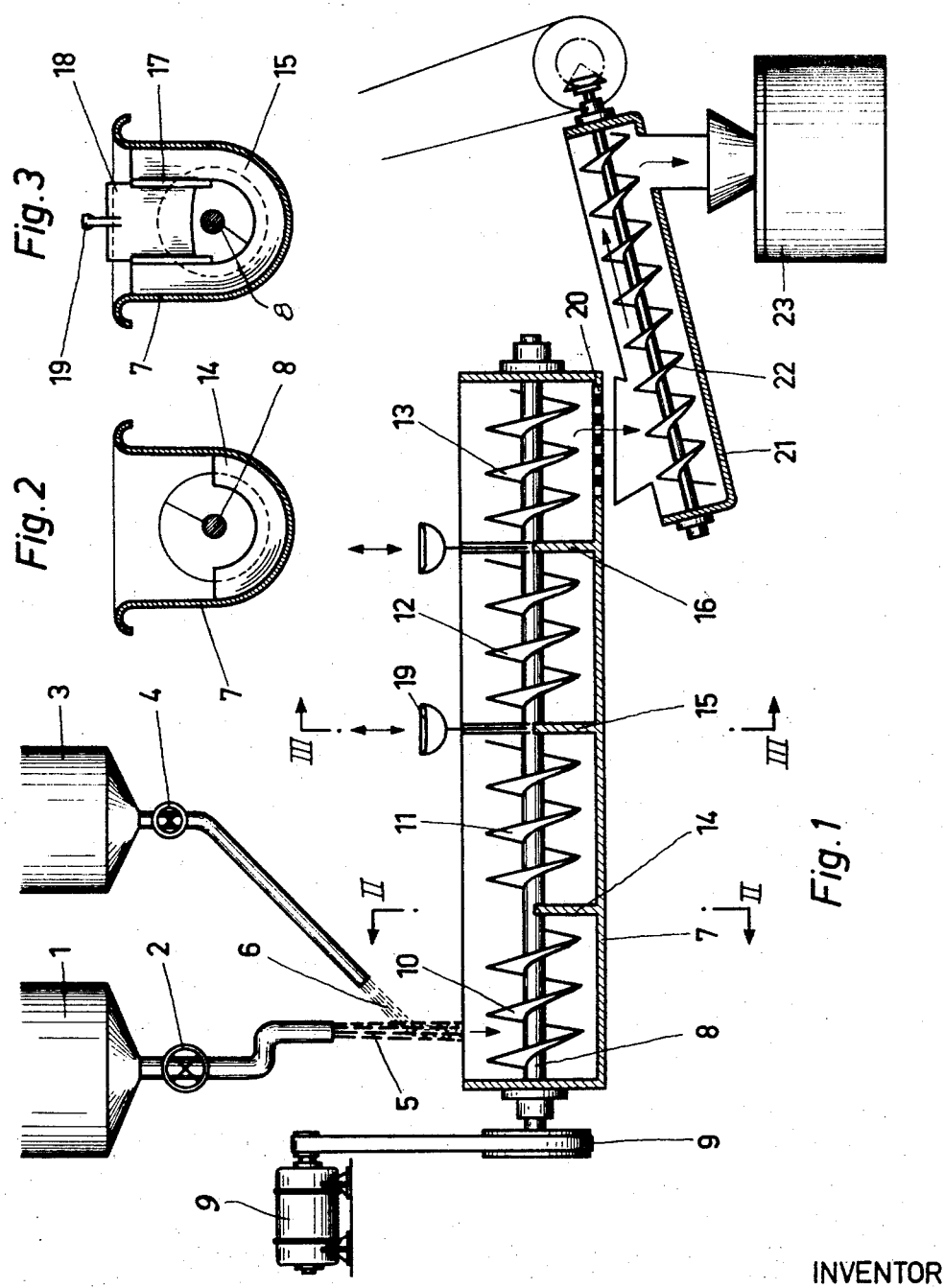

Elisabeth S. W. M. Schultz, Vilbeler Strasse 17, Frankfurt am Main-Fechenheim, Germany
Continuation of application Ser. No. 466,503, June 2, 1965. This application Oct. 17, 1966, Ser. No. 596,367
Int. Cl. C08h *11/00, 17/24*
U.S. Cl. 106—238                                     4 Claims

---

ABSTRACT OF THE DISCLOSURE

Dry rosin size is continuously produced by fully saponifying rosin with sodium hydroxide. The hot rosin and hot caustic are mixed at atmospheric pressure, the caustic solution containing 40–50% sodium hydroxide and the amount of the solution being sufficient to provide 16 to 19 parts by weight of sodium hydroxide and 11 to 29 parts by weight of water per 100 parts by weight of rosin in the initial mixture. The exothermic reaction produces a gel which rapidly dries into a friable mass containing about 10% water by weight.

---

This is a continuation of my co-pending application Ser. No. 466,503, filed June 2, 1965, now abandoned, which is a continuation-in-part of my abandoned application Ser. No. 221,467, filed Sept. 5, 1962, which was a continuation of my abandoned application Ser. No. 781,850, filed Dec. 22, 1958.

This invention relates to the production of dry rosin size for paper and the like by saponification of rosin with aqueous caustic alkali.

The term "rosin," as employed in this specification and the appended claims, includes the product usually referred to as gum rosin, wood rosin and talloil rosin. The term "rosin" also covers such products as hydrogenated rosins and fortified rosins. The balance of the rosin employed for the process of the invention may include such substances as naphthenic acids, fatty acids, such as stearic acids, and paraffin.

Commercial rosin size is sold either as a more or less concentrated aqueous solution ("liquid rosin size") or as a dry powder. The powder has the advantage of being packaged and shipped more conveniently and more economically. The usual commercial methods for the production of dry rosin size employ two-step processes in which an aqueous soap solution containing about 70 percent soap is produced first and the excess water is removed by evaporation on heated calendars or in spray drying towers or out of the reaction-vessel itself. In all these methods of producing dry rosin size, the amount of caustic soda for the saponification is not more than 14 percent by weight of the rosin used, in stoichiometric amounts. The caustic soda solution has a minimum concentration of 70 percent.

I have found that a dry rosin size may be obtained in a single stage operation in continuous flow in an extremely short time if the ratio of rosin to alkali to water is held within critical limits.

In my process, hot fused rosin and hot sodium hydroxide solution are reacted at atmospheric pressure, the fused rosin having a temperature of at least 130° C. and the aqueous sodium hydroxide solution having a temperature above 60° C., to form a gel, the initial reaction mixture containing more than 16, but not exceeding 19 parts by weight of sodium hydroxide and at least about 11, but not exceeding 29 parts by weight of water for each 100 parts by weight of the rosin. When a stream of the fused rosin and a stream of the hot aqueous sodium hydroxide solution in a concentration of 40 to 60% by weight of sodium hydroxide are mixed continuously in the indicated proportions, they react spontaneously and exothermically to form a gel in the reaction zone. This gel is moved continuously through and away from the reaction zone and continuously conveyed to and through another zone. A friable and porous mass having a residual water content of about 10 to 12 parts by weight is then removed continuously from the other zone, and this mass may be subsequently comminuted into a powder while still hot.

The rosin size produced according to my method may be stored for an extended period without deteriorating or absorbing atmospheric moisture. It readily and completely dissolves in water to form a stock solution of about 8 percent concentration. Because of its ready solubility, the dry rosin size of my invention may safely be added in the solid state to paper stock in a beater or pulper.

The rosin size of my invention is readily prepared in equipment which is inexpensive to build, simple to operate and easy to control. It contains an excess of alkali, is dry, yet not hygroscopic, and has a superior sizing effect, as compared to otherwise similar conventional sizes.

The exact nature of this invention as well as other objects and advantages thereof will be readily apparent from consideration of the following description taken in conjunction with the annexed drawing in which:

FIG. 1 is a somewhat diagrammatic elevational view, partly in section, of preferred apparatus for carrying out the method of the invention;

FIG. 2 shows a detail of the apparatus of FIG. 1 in section on the line II—II;

FIG. 3 shows another detail of the apparatus of FIG. 1 in section on the line III—III.

Figure 4:
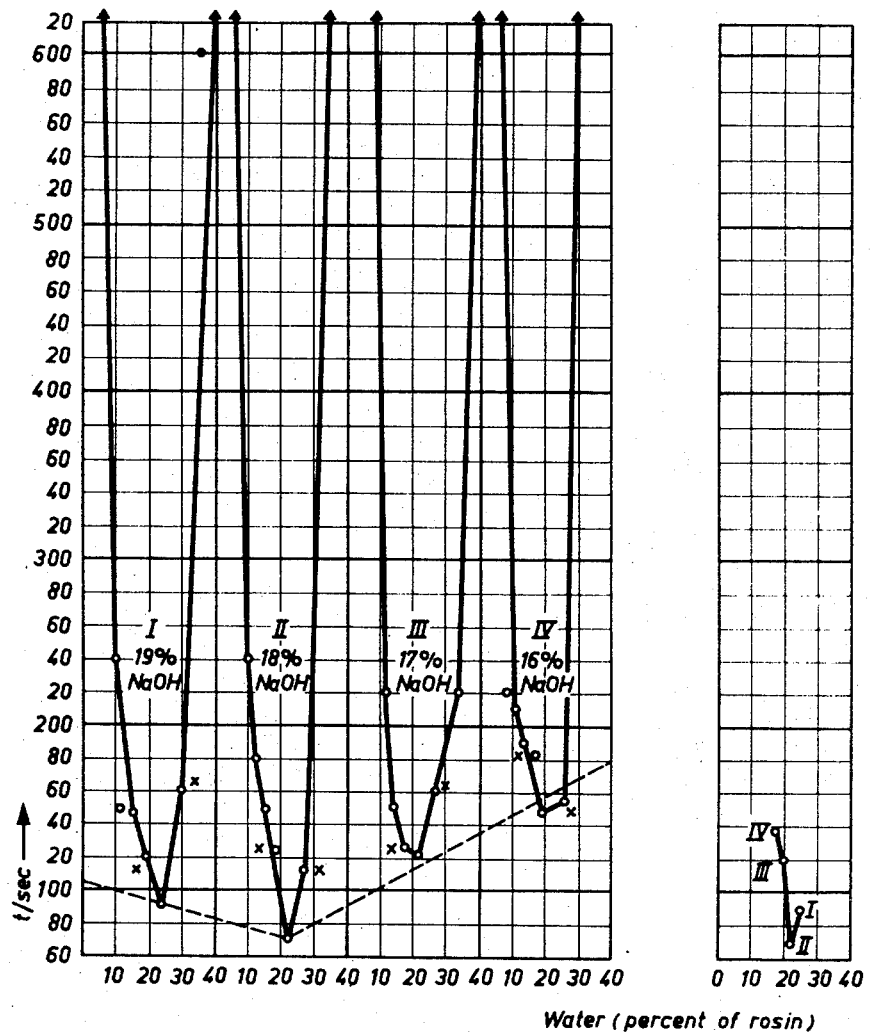
FIG. 4 is a composite chart showing the results of process variables on the results of the method of the invention.

Referring initially to FIGS. 1 to 3, there is seen a cylindrical vat 1 equipped with a suitable heating jacket (not shown) to maintain a rosin mass contained in the vat at a temperature of 130° C. to 160° C. The vat is equipped with a bottom discharge tube fitted with an adjustable metering valve 2. A similar vat 3 has a heater (not shown) for holding sodium hydroxide solution at any stable temperature between 60° C. and 90° C. The vat 3 has a bottom discharge tube fitted with an adjustable metering valve 4. The two discharge tubes are arranged in such a manner that fused rosin and hot aqueous sodium hydroxide released in respective streams 5 and 6 from the discharge tubes of the vats 1 and 3 mix at least partly in mid-air.

An unheated screw conveyor having a horizontal open trough 7 and a mixing and conveying screw 8 is arranged to receive the liquid mass of rosin and alkali. The screw is driven by a motor 9 by means of a belt drive 9'. The conveyor screw 8 has four separate longitudinal sections 10, 11, 12 and 13 which rotate in corresponding compartments of the trough 7. The compartments are partly separated by partitions 14, 15 and 16. As seen best in FIG. 2, the two identical partitions 15 and 16 additionally include respective wall portions 17 which extend upwardly from the annular disc portions to define a passage about the axis of the screw 8. The size of this passage may be adjusted by a valve gate 18 operated by a handle 19 above the trough 7.

The bottom of the trough compartment at the discharge end of the screw conveyor is partly formed by a grate or screen 20. The screen is located above the feed end of an inclined screw conveyor 21 the screw 22 of which raises the material received from the trough 7 to the intake level of a grinder 23.

The afore-described apparatus is operated as follows:
Fused rosin (130–160° C.) and hot caustic soda solution (60–90° C.) are discharged from the respective vats 1, 3 into a reaction zone at the feed end of the trough 7. The saponification between rosin and alkali proceeds at atmospheric pressure and is exothermic. The high temperature of the fused rosin and the sodium hydroxide solution, combined with the heat generated by the exothermic spontaneous reaction, causes evaporation of some of the water formed by neutralization and of a portion of the original water content of the alkali solution. The reactions components are thoroughly mixed by the screw section 10 and the reaction mixture becomes a gel which is transferred over the partition 14 into the next compartment. The partition acts as a baffle which further enhances mixing.

Within the conveyor section 11 the gel solidifies almost completely and the resultant porous friable mass is broken during passage through the gate of the partition 15. The comminution of the reaction product is carried further by the screw section 12. The material discharged into the last compartment of the trough 7 through the partition 16 is a hot coarse powder. Particles of sufficiently small size drop through the screen 20 into the conveyor 21 and are fed to the grinding mill 23. The mill is of conventional type and continuously discharges the rosin soap as a fine powder.

In one specific production run, the valves 2, 4 were adjusted to respectively deliver per minute 18 kilograms of fused rosin and 7.2 kilograms of a 45 percent solution of sodium hydroxide. The mixing and conveying screw 8 had a total length of 370 cm. and a pitch of 15 cm. It was rotated at 70 revolutions per minute and the fused rosin and sodium hydroxide solution were reacted at respective temperatures of about 150° C. so that the product needs only 6–7 seconds to become a dry powder out of fluid masses.

The influence of process variables on the time required for solidification of the reaction mixture under closely controlled uniform laboratory conditions is shown in the following Tables I to IV. The experiments, the results of which are tabulated below and graphically illustrated in FIG. 4 were performed as follows: 150 grams rosin were heated to 150° C. Aqueous sodium hydroxide solutions varying in concentration between 30 percent and 75 percent were prepared from the indicated amounts of sodium hydroxide and water, and heated to a temperature between 70° C. and 85° C. The rosin melt and the hot aqueous alkali were poured in a common stream into an unheated vessel equipped with a strong, rapidly rotating stirrer. An exothermic reaction started at once but the release of heat was not such as to require special precautions. There was no foaming nor was there a significant amount of spattering.

When the ratio of reactants was within the above-specified limits, the mass was solidified within the indicated terms and became the size of lumps like broadbeans, which lumps may be milled instantaneously at a temperature of 90° C. About one third of the water introduced by the aqueous solution of sodium hydroxide and also resulting from the saponification-reaction escapes during the reaction. No outside heating of this vessel is effected, the reaction temperature itself being sufficient.

TABLE I.—SOLDIUM HYDROXIDE SOLUTION

[Reactants: 150 grams rosin and 28.5 grams NaOH (19 percent of rosin weight)]

| Total weight, grams | Weight of water, grams | Percent NaOH | Weight of water per 100 g. rosin, grams | Solidification time of reaction mixture, seconds |
|---|---|---|---|---|
| 95.0 | 66.5 | 30 | 44.3 | |
| 81.3 | 52.9 | 35 | 35.5 | 600 |
| 71.3 | 42.8 | 40 | 28.5 | 160 |
| 63.3 | 34.8 | 45 | 23.2 | 60 |
| 57.0 | 28.5 | 50 | 19.0 | 120 |
| 51.8 | 23.3 | 55 | 15.5 | 145 |
| 47.5 | 19.0 | 60 | 12.66 | 150 |
| 43.85 | 15.35 | 65 | 10.23 | 240 |
| 38.0 | 9.5 | 75 | 6.3 | |

TABLE II.—SODIUM HYDROXIDE SOLUTION

[Reactants: 150 grams rosin and 27.0 grams NaOH (18 percent of rosin weight)]

| Total weight, grams | Weight of water, grams | Percent NaOH | Weight of water per 100 g. rosin, grams | Solidification time of reaction mixture, second |
|---|---|---|---|---|
| 77.2 | 50.2 | 35 | 33.4 | |
| 67.5 | 40.5 | 40 | 27.0 | 115 |
| 60.0 | 33.0 | 45 | 22.0 | 70 |
| 54.0 | 27.0 | 50 | 18.0 | 125 |
| 49.0 | 22.0 | 55 | 14.7 | 152.50 |
| 45.0 | 18.0 | 60 | 12.0 | 180 |
| 41.5 | 14.5 | 65 | 9.7 | 240 |
| 36.0 | 9.0 | 75 | 6.0 | |

TABLE III.—SOLDIUM HYDROXIDE SOLUTION

[Reactants: 150 grams rosin and 25.5 grams NaOH (17 percent of rosin weight)]

| Total weight, grams | Weight of water, grams | Percent NaOH | Weight of water per 100 g. rosin, grams | Solidification time of reaction mixture, seconds |
|---|---|---|---|---|
| 85.0 | 59.5 | 30 | 39.6 | |
| 73.0 | 47.5 | 35 | 31.7 | 220 |
| 64.0 | 38.5 | 40 | 25.7 | 160 |
| 56.5 | 31.0 | 45 | 20.7 | 120 |
| 51.0 | 25.5 | 50 | 17.0 | 125 |
| 46.4 | 20.9 | 55 | 13.9 | 150 |
| 42.5 | 17.0 | 60 | 11.3 | 220 |
| 39.2 | 13.7 | 65 | 9.15 | |

TABLE IV.—SOLDIUM HYDROXIDE SOLUTION

[Reactants: 150 grams rosin and 24.0 grams NaOH (16 percent of rosi weight)]

| Total weight, grams | Weight of water, grams | Percent NaOH | Weight of water per 100 g. rosin, grams | Solidification time of reaction mixture, seconds |
|---|---|---|---|---|
| 68.6 | 44.6 | 35 | 29.7 | |
| 60.0 | 36.0 | 40 | 24.0 | 155 |
| 53.0 | 29.0 | 45 | 19.3 | 145 |
| 48.0 | 24.0 | 50 | 16.0 | 180 |
| 43.6 | 19.6 | 55 | 13.1 | 190 |
| 40.0 | 16.0 | 60 | 10.7 | 210 |
| 37.0 | 13.0 | 65 | 8.7 | 220 |
| 32.0 | 8.0 | 75 | 5.3 | |

Where no solidification times are given in Tables I to IV, the reaction mixture failed to solidify and remained a highly viscous fluid.

The experimental results tabulated above are graphically represented in FIG. 4. In the chart of FIG. 4, the solidification time in seconds is plotted against the amount of water fed to the reaction zone, as expressed in weight per cent of the amount of rosin employed. For the sake of clarity, the chart is subdivided into several sections. In each section, the percentage water values range from zero to 40 percent. The first four sections respectively represent the results tabulated in Tables I to IV. The last section correlates the shortest solidification times of Tables I to IV and of the corresponding chart sections with the water percentage.

It is readily apparent that the amount of water initially present in the reaction mixture is critically important. The reaction time necessary for a dry product reaches a minimum at a sharply defined water percentage for each ratio of alkali to rosin. Any deviation from this initial water content of the reaction mixture substantially increases the reaction time, and solidification may be indefinitely delayed at water percentages which are not very much higher or lower than the optimum value. The ratio of sodium hydroxide to rosin also must be closely controlled as is evident from the sharp minimum in the last section of the chart. A large excess of alkali is to be avoided in order to prevent the formation of a hygroscopic rosin size.

The rate of agitation and material movement has an important bearing on the solidification time. When the laboratory experiments were repeated on the apparatus shown in FIG. 1 on an industrial scale, the solidification times were reduced to almost one tenth.

In comparative experiments, paper sheets prepared under uniform laboratory conditions with the rosin size of this invention and with conventional rosin sizes were subjected to ink floating tests. Squares of paper were floated on writing ink at a constant temperature, and the whiteness of the light reflected from the top surface of the sheet was determined by means of a photometer using an orange filter (German standard filter 162). The results are listed in Table V, wherein the reflected light values are expressed on a percentage scale on which magnesium oxide rates 100. The paper employed when tested in multiple layers without ink and without sizing gave readings of 93.74% under otherwise corresponding conditions. A single sheet of the unsized paper on a black substrate gave a reading of 76.23%.

The Table V correlates the amount of rosin solids admixed to the paper in percent of fiber content with the light readings obtained from papers prepared with different types of sizings.

The several rosin sizes compared were as follows:

(A) Dry rosin size prepared according to this invention
(B) Commercial 25% liquid rosin size
(C) Commercial 40% liquid rosin size
(D) Commercial 40% rosin emulsion.

In each rosin size column a horizontal line separates readings above and below 50 percent.

TABLE V.—TESTS WITH IRON GALLATE INK

| Rosin Solids, Percent | Reflected light, Percent of MgO | | | |
|---|---|---|---|---|
| | Rosin Size A | Rosin Size B | Rosin Size C | Rosin Size D |
| 0.0 | 4.08 | 4.08 | 4.08 | 4.08 |
| 0.5 | 8.57 | 4.37 | 5.26 | 5.40 |
| 1.0 | 61.13 | 25.25 | 40.91 | 39.62 |
| 1.5 | 64.64 | 50.09 | 55.74 | 57.79 |
| 2.0 | 66.18 | 59.44 | 62.00 | 64.27 |
| 2.5 | 66.73 | 61.24 | 65.45 | 66.04 |

It is evident from Table V that the dry rosin size of the invention is effective in smaller amounts than the liquid sizes of the comparison test which are considered to represent good commercial quality.

While the invention has been described with particular reference to specific embodiments, it is to be understood that it is not limited thereto, but is to be construed broadly and restricted solely by the scope of the appended claims.

What I claim is:

1. A method of continuously producing dry rosin size by saponification of rosin with aqueous caustic alkali which comprises:
   (a) mixing a continuous stream of fused rosin having a temperature of at least 130° C. and a continuous stream of a aqueous sodium hydroxide soluting having a temperature above 60° C. in a reaction zone at atmospheric pressure, the concentration of the sodium hydroxide solution being between 40–60% and the amount of the sodium hydroxide solution being such as to provide at least 16 but not exceeding 19 parts by weight of sodium hydroxide, and at least about 11 but not exceeding 29 parts by weight of water for each 100 parts by weight of said rosin in a continuously produced initial mixture, said hot rosin and said hot sodium hydroxide spontaneously and exothermically reacting to form a gel in said reaction zone;
   (b) continuously moving said gel through and away from said reaction zone;
   (c) continuously conveying the gel from said reaction zone to and through another zone maintained at atmospheric pressure; and
   (d) continuously removing from said other zone a friable mass having a residual water content of about 10 to 12 parts by weight.

2. The method of claim 1, wherein the rosin is heated to a temperature of at least 130° C. but not substantially in excess of 160° C., the aqueous sodium hydroxide solution is heated to a temperature above 60° C. but not substantially in excess of 90°, and the heated rosin and the heated sodium hydroxide solution are formed into said streams.

3. The method of claim 1, comprising the further step of comminuting the friable mass.

4. A method of producing a continuous flow of a friable, dry rosin size by saponification of rosin with aqueous caustic alkali, which comprising continuously mixing at atmospheric pressure fused rosin having a temperature of at least 130° C. and an aqueous sodium hydroxide solution having a temperature above 60° C., the solution containing 40 to 50% by weight of sodium hydroxide and the amount of the solution being sufficient to provide at least 16 but not exceeding 19 parts by weight of sodium hydroxide, and at least about 11 but not exceeding 29 parts by weight of water for each 100 parts by weight of said rosin in the initial mixture, and continuously removing the reaction product of said mixture in the form of a friable mass.

References Cited

UNITED STATES PATENTS

| 2,717,838 | 9/1955 | Barthel et al. | 106—218 |
| 2,842,453 | 7/1958 | Anderson et al. | 106—238 |

FOREIGN PATENTS

| 28,886 | 10/1907 | Great Britain. |

ALLAN LIEBERMAN, Primary Examiner

PO-1050
(5/69)

UNITED STATES PATENT OFFICE
CERTIFICATE OF CORRECTION

Patent No. 3,468,686　　　　　Dated September 23, 1969

Inventor(s)　　Elisabeth S. W. M. Schultz

It is certified that error appears in the above-identified patent and that said Letters Patent are hereby corrected as shown below:

In the heading, between the penultimate line and the last line, insert:

Claims priority, German application No. C 16058 IVa/23e, filed January 7, 1958

SIGNED AND
SEALED
JUN 9 1970

(SEAL)
Attest:

Edward M. Fletcher, Jr.
Attesting Officer

WILLIAM E. SCHUYLER, JR.
Commissioner of Patents